US010941587B2

(12) United States Patent
Andersen

(10) Patent No.: US 10,941,587 B2
(45) Date of Patent: Mar. 9, 2021

(54) LATCH FITTING TOOL

(71) Applicant: Jesper Birk Andersen, Hong Kong (CN)

(72) Inventor: Jesper Birk Andersen, Hong Kong (CN)

(73) Assignee: SAFE AND CARE LTD., Hong Kong (CN)

( * ) Notice: Subject to any disclaimer, the term of this patent is extended or adjusted under 35 U.S.C. 154(b) by 376 days.

(21) Appl. No.: 16/194,908

(22) Filed: Nov. 19, 2018

(65) Prior Publication Data

US 2019/0085594 A1 Mar. 21, 2019

Related U.S. Application Data

(62) Division of application No. 15/132,275, filed on Apr. 19, 2016, now Pat. No. 10,174,518.

(30) Foreign Application Priority Data

Apr. 20, 2015 (GB) ...................................... 1506682

(51) Int. Cl.
*B23P 19/00* (2006.01)
*E05B 17/06* (2006.01)
*E05B 65/00* (2006.01)
*E05B 65/46* (2017.01)

(52) U.S. Cl.
CPC .......... *E05B 17/06* (2013.01); *E05B 65/0014* (2013.01); *E05B 65/46* (2013.01)

(58) Field of Classification Search
CPC ... B25B 3/00; B25B 5/00; B23P 11/00; B23P 19/00; B23P 19/04; E05B 65/46; E05B 65/00
See application file for complete search history.

(56) References Cited

U.S. PATENT DOCUMENTS

| | | | |
|---|---|---|---|
| 5,626,372 A | 5/1997 | Vogt | |
| 5,875,535 A | 3/1999 | Canoy | |
| 6,029,335 A | 2/2000 | Hui et al. | |
| 6,250,730 B1 | 6/2001 | Roth et al. | |
| 7,712,199 B1 | 5/2010 | Wilson | |
| 7,971,329 B1 | 7/2011 | Brohard | |
| 8,069,544 B2 | 12/2011 | Sollami | |
| 9,655,310 B1 | 5/2017 | Hernstedt | |
| 10,174,518 B2 * | 1/2019 | Andersen | E05B 17/06 |
| 2016/0305159 A1 * | 10/2016 | Andersen | E05B 65/46 |
| 2019/0085594 A1 * | 3/2019 | Andersen | E05B 65/46 |

FOREIGN PATENT DOCUMENTS

CA 2417948 A1 8/2004

OTHER PUBLICATIONS

GB Search Report, Application No. GB1506682.2, dated Sep. 23, 2015, 4 pgs.

* cited by examiner

*Primary Examiner* — Lee D Wilson
(74) *Attorney, Agent, or Firm* — Fay Sharpe LLP

(57) ABSTRACT

A method of fitting a childproof latch fitting mechanism and a latch installation tool arranged to locate between a first latch fitting and a second latch fitting, to spatially locate the first and second latch fitting at a pre-determined distance respectfully one from the other, wherein in the installation tool is temporarily attached to the first and second latch fittings, whilst they are located and fixed, at least temporarily in place.

17 Claims, 3 Drawing Sheets

LATCH FITTING TOOL

REFERENCE TO RELATED APPLICATION

This application is a divisional application of U.S. patent application Ser. No. 15/132,275 which was filed on Apr. 19, 2016. That application in turn claims priority to and the benefit of UK patent application GB 1506682.2, filed Apr. 20, 2015 and entitled "LATCH FITTING TOOL", the entireties of which are hereby incorporated by reference.

The present invention relates to a latch fitting tool for latches for drawers, cabinet doors and the like, and, more particularly, to "child-proof" latches that include features which make them difficult to be actuated by small children.

BACKGROUND OF THE INVENTION

Drawers are commonly used in daily life in kitchens, bedrooms, offices, etc. to store a wide range of articles, some of which may be harmful to children. Small children may also attempt to climb on, or even in, drawers and cabinets in an effort to hide. Drawers and cabinets may house many types of materials which may be potentially hazardous to children such as medicines, household cleaners, knives, tools, paint, etc.

To prevent young children from accessing these storage areas, numerous items have been patented and sold, most of a multi-piece assembly. Generally, some sort of a longitudinal member with a hook portion is attached to the inside surface of a drawer or door to limit the amount the drawer or door may be opened. The hook portion may engage with a stop installed on a frame portion of the cabinet as the drawer or door is withdrawn. Only a small space may then remain for an adult to insert their finger to depress the longitudinal member such that the hook may clear the stop on the frame of the enclosure.

In many cases, these latches require at least two components, which need alignment during installation or adjustment after installation. These components generally include a stop portion, or catch, attached to the enclosure and a hook portion attached to the inside of the drawer. This mechanism may further require a biasing member (springs, etc.) to bias the hook member against the stop member.

What is needed is a "child-proof" safety latch that is easy to install on the inside surface of a drawer, or door, and which includes more than one action which must be actuated to release the latch. Thus, a drawer, or cabinet door, may only be partially opened and its contents kept secure from children. Upon actuation of the more than one action by an adult, the contents may become accessible.

It is thus an object of the present invention to provide a latch which may preferably be moulded of plastic to provide a low cost safety latch.

It is a further object of the present invention to provide a childproof safety latch which may be easily installed on the interior of a drawer or door without the need for taking measurements.

DETAILED DESCRIPTION

The present invention is described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
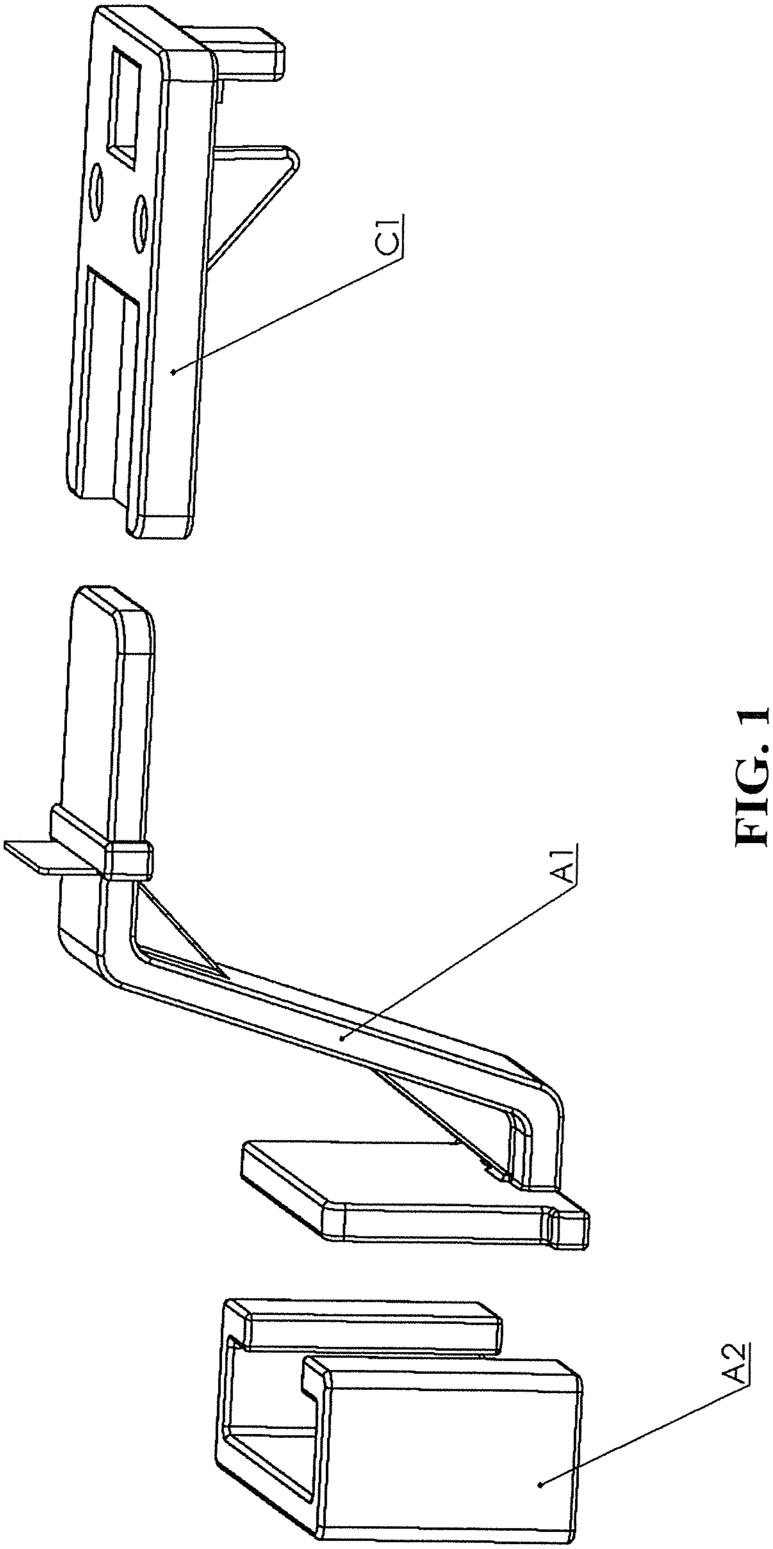
FIG. 1: shows a perspective view of an exemplary embodiment of the first part of the latch fitting mechanism of the invention.
Figure 2:
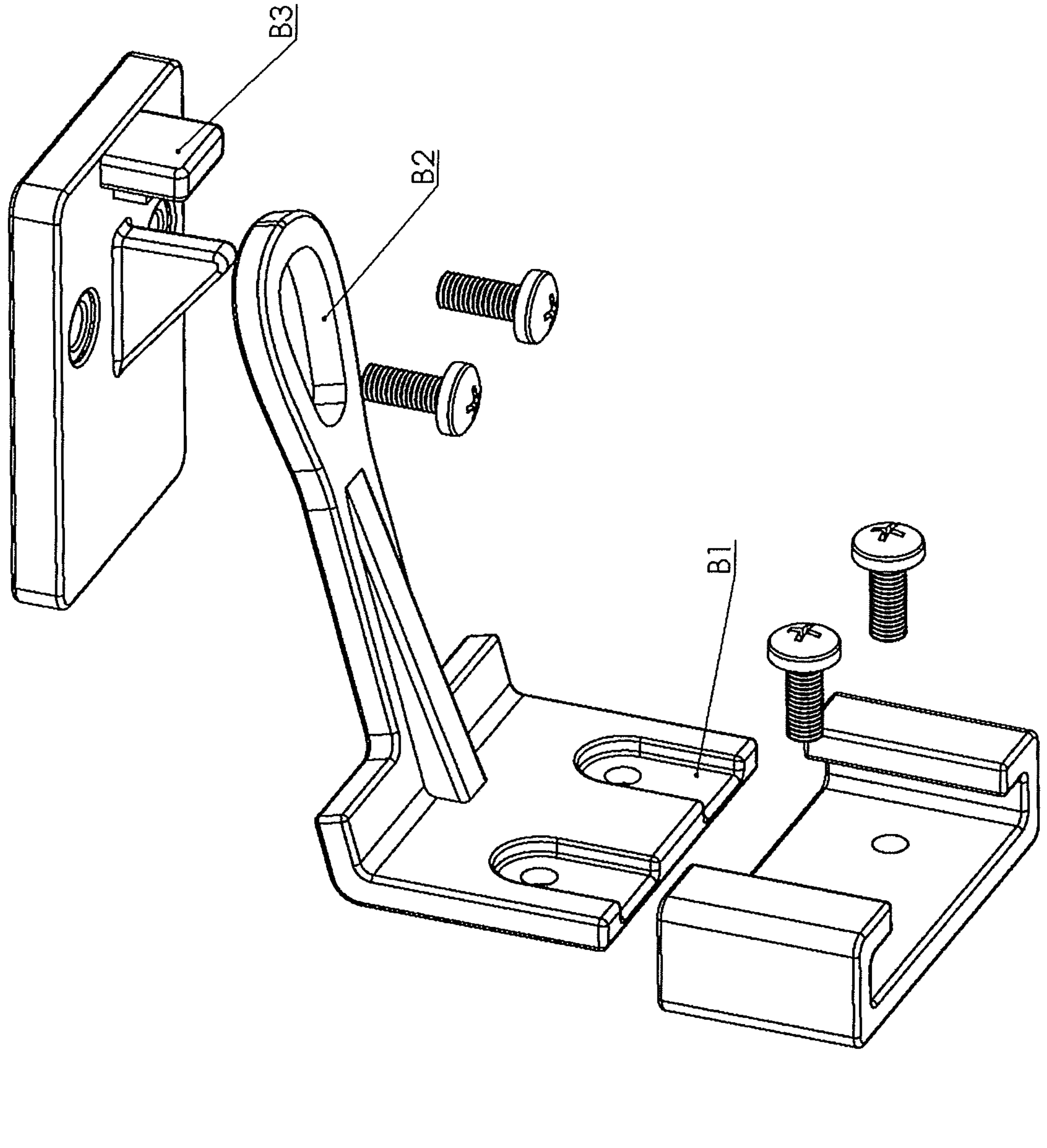
FIG. 2: shows a perspective view of an exemplary embodiment of a latch mechanism of the invention.

Referring now to FIG. 1, a first exemplary embodiment of a childproof latch fitting mechanism, according to the present invention, is illustrated in perspective view. The latch fitting mechanism includes a latch installation tool A1 arranged to locate between a first latch fitting A2 and a second latch fitting C1. Referring to FIG. 2, the latching member B1 includes a cantilever member B3 with a hollow or holed section B2 at its remote end, preferably but not limited to moulded of a resilient plastic. The childproof latch may be attached to the inner surface of a drawer to restrict the amount that the drawer may be easily opened. (A maximum of 30 mm is the European safety standards). The latching member B1 may comprise any longitudinal member B3 having a hook or detent portion B2 for engaging the second latch fitting C1 located on the cupboard encasement in which the drawer slides. The second latch fitting includes a protrusion or hook C2 for locating the latching member B1 relative to the drawer front and the top or the side of the drawer on the inside surface. Holes are provided in the first latch fitting A2 and the second latch fitting C1 for attachment to the inside surface of a side of the drawer or cupboard with mechanical fasteners, such as small nails or screws. Double-sided tape or hook-and-loop type fasteners, such as Velcro® may also be used. The holes are preferably at diverging angles to one another to assist in locating and securing the latch 10 to the inside of the drawer. By diverging the holes, after one nail or screw has secured the latch to the inside surface of a drawer, the other nail or screw may be driven in, and in doing so may tighten against the first. In addition, any force applied to the latch, as by opening or closing the drawer, may tighten the latch to the drawer.

It is also contemplated that the latch member B1 of the present invention is moulded such that, when fitted, the cantilever member B3 is urged against the second latch fitting to allow the respective walls of the drawer or cupboard to be offset one from the other.

Figure 3:
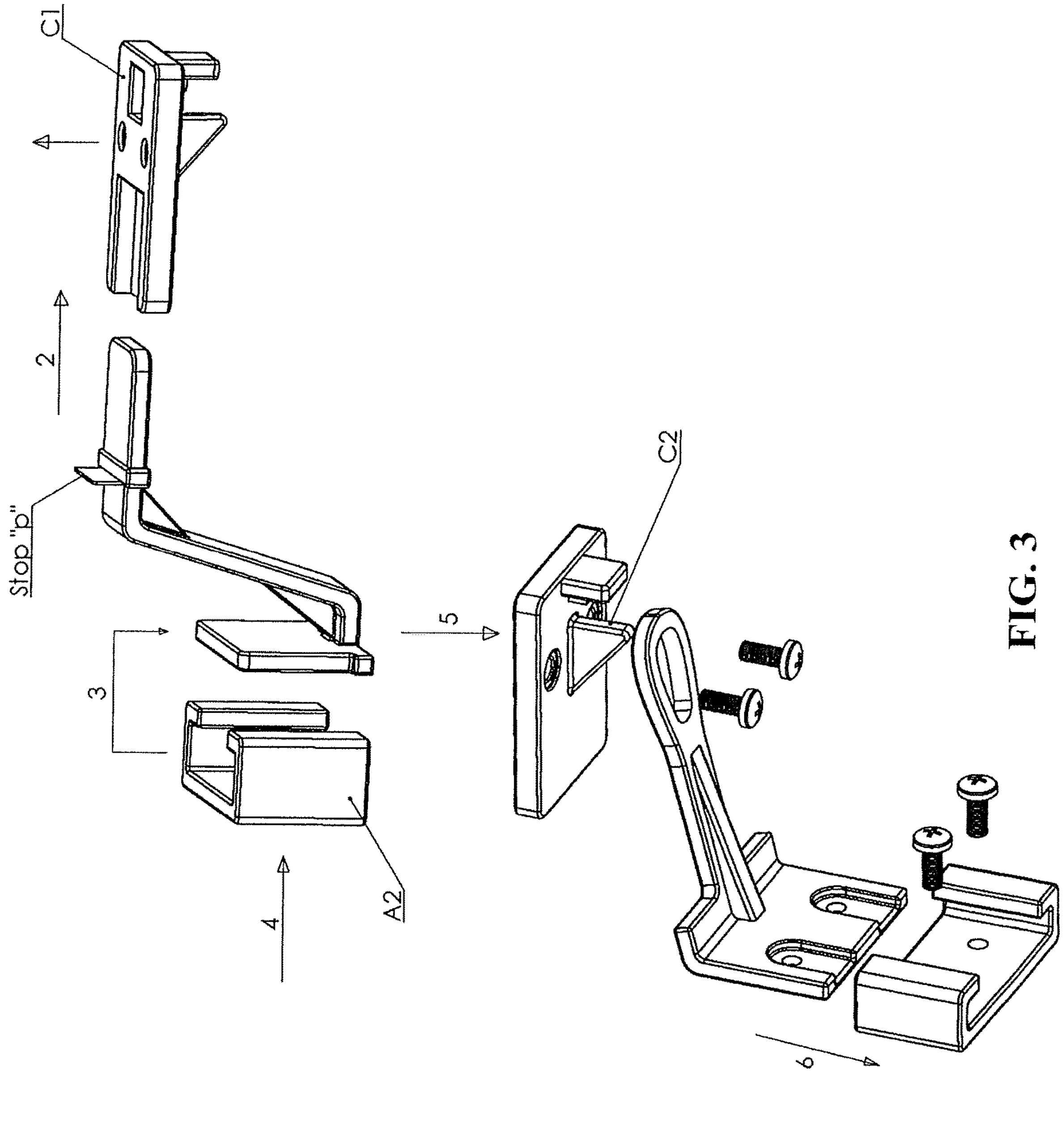
FIG. 3: shows a perspective view of an exemplary embodiment of the latch fitting mechanism and the latch mechanism of the present invention showing the fitting steps.

The method of fitting the latch mechanism according to the invention will now be described with reference to FIG. 3. In a first step the second latch fitting C1 is secured to the side wall of the cupboard or drawer carcase. In this embodiment the second latch fitting C1 is shown being secured upwardly against the carcase wall. It should be appreciated that "laterally" and "downward" are relative terms and that the latch may be installed in a plane essentially perpendicular from that shown in FIG. 3, as on a cabinet door. In that case the walls would be deflected downwardly (or upwardly) and the hook portion laterally (to the horizontal). It is further contemplated that the latch of the present invention may be installed at any angle, not just in a vertical or horizontal plane, including 180° from either horizontal or vertical, and all increments in between.

The second latch fitting C1 may conveniently be attached at least initially by means of pre-applied adhesive whilst the drawer is still in place, and the cupboard filled with contents, and optionally secured with screws later.

The location of the second latch fitting C1 in relation to the carcase wall is determined by a stop p located on the installation tool A1 when the installation tool A1 is inserted into a slot in the second latch fitting C1.

The first latch fitting A2 is now located, by sliding, on the opposite end of the installation tool A1. The first latch fitting A2 also has a pre-applied adhesive on its side opposite to the slide fitting to the installation tool A1.

The drawer or cupboard door is now closed and as a consequence the inside surface of the drawer or cupboard door comes into contact with the pre-applied adhesive on the first latch fitting A2. Thus the first latch fitting A2 and the installation tool A1 become attached to the inside surface of the drawer or cupboard door. The adhesive is sufficiently strong to permit the drawer or cupboard door to be opened with the first latch fitting A2 and installation tool A1 still attached, the installation tool A1 being releases from the sliding connection with the second latch fitting C1.

Once released from the second latch fitting C1, the installation tool A1 slidably falls from, or can be readily slidably removed from, the first latch fitting A2. The first latch fitting A2 and the second latch fitting C1 remain in their respective adhered positions on the respective drawer or cupboard door and carcase wall, and these are precisely correct positions for the latching member B1 due to the corresponding dimensions of the installation tool A1. In the next step the latching member B1 is slid into the first latch fitting A2 secured in the fitted position by screws, which also pass through the first latching member A2 into the wall of the drawer or cupboard door, which also served to more firmly affix the first latching member A2. Screws may now be used to additionally more firmly secure the second latch fitting C1 to the carcase wall. Thus the latching mechanism is accurately positioned which will lead to its more effective and durable use.

Thus, a childproof latch is provided which may be easily installed on the inside of a closure member without power tools or the need to measure. The latch may allow partial opening of the closure member but requires an additional actions to be carried out so that the enclosure which the member closes may be freely accessed.

It should be understood that although specific embodiments of the present invention have been described herein in detail, such descriptions are for purposes of illustration only and modifications may be made thereto within the scope of the invention.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

The invention claimed is:

1. A method of fitting a childproof latch fitting mechanism to a cupboard or drawer carcase, the latch fitting mechanism including a latch installation tool arranged to locate between a first latch fitting and a second latch fitting, and a latching member, the method comprising the following steps:

securing the second latch fitting is secured to the side wall of the cupboard or drawer carcase, the location of the second latch fitting in relation to the carcase wall is determined by a stop p located on the installation tool when the installation tool is inserted into a slot in the second latch fitting, the first latch fitting is then located, by sliding, on the opposite end of the installation tool, the first latch fitting having a pre-applied adhesive on its side opposite to the slide fitting to the installation tool, the drawer or cupboard door is then closed and as a consequence the inside surface of the drawer or cupboard door comes into contact with the pre-applied adhesive on the first latch fitting, such that the first latch fitting and the installation tool become attached to the inside surface of the drawer or cupboard door, the drawer or cupboard door is then opened releasing the installation tool from the second latch fitting, the installation tool slidably falls from, or can be readily slidably removed from, the first latch fitting, such that the first latch fitting and the second latch fitting remain in their respective adhered positions on the respective drawer or cupboard door and carcase wall, and these are precisely correct positions for the latching member due to the corresponding dimensions of the installation tool, and in the next step the latching member is slid into the first latch fitting to form the complete fitted latching mechanism.

2. A method according to claim 1, wherein the latching member is secured in the fitted position by screws.

3. A method according to claim 2, wherein the screws also pass through the first latching member into the wall of the drawer or cupboard door, which also serves to more firmly affix the first latching member.

4. A method according to claim 1, wherein screws are used to additionally more firmly secure the second latch fitting to the carcase wall.

5. A method of fitting first and second latch fittings of a childproof latch system to a cupboard or drawer carcase having a door or drawer movable between a closed position and an open position, the method comprising:

mounting the second latch fitting to an interior surface of the cupboard or drawer carcase;

locating the first latch fitting in spaced relation relative to the second latch fitting using a latch installation tool coupled with each of the first and second latch fittings;

securing the first latch fitting to the door of the cupboard or the drawer of the drawer carcase by bringing the door or the drawer to the closed position such that the door of the cupboard or drawer of the drawer carcase engages the first latch fitting; and removing the latch fitting tool from the second latch fitting by opening the door of the cupboard or drawer of the drawer carcase.

6. The method of claim 5, wherein the first and second latch fittings include slots for slideably receiving respective first and second ends of the latch installation tool, and wherein the first and second ends of the latch fitting tool extend at right angles to each other.

7. The method of claim 6, wherein the second latch fitting is secured to the interior surface in an orientation to receive the latch fitting tool along a horizontal axis.

8. The method of claim 7, wherein when the second end of the latch installation tool is engaged with the second latch fitting mounted on the interior surface, the first latch fitting is supported in cantilevered fashion by the first end of the latch installation tool prior to securing to the door of the cupboard or the drawer of the drawer carcase.

9. The method of claim 8, wherein the latch installation tool is slideably removable from the first latch fitting along a vertical axis.

10. The method of claim 9, wherein the first latch fitting includes an adhesive on a surface thereof facing the door of the cupboard or the drawer of the drawer carcase when in the closed position, whereby the adhesive bonds to the door of the cupboard or the drawer of the drawer carcase when in the closed position, and wherein opening of the door of the cupboard or the drawer of the drawer carcase draws the latch installation tool from the second latch fitting.

11. The method of claim 5, wherein the first and second ends of the latch installation tool extend from a connecting portion, the first and second ends configured to releasably engage the first and second latch fittings such that the first latch fitting is supported at a predetermined distance from the second latch fitting by the latch installation tool;

wherein the first end of the latch installation tool is adapted to slidingly engage the first latch fitting along a first axis;

wherein the second end of the latch installation tool is adapted to slidingly engage the second latch fitting along a second axis;

wherein the first axis and second axis are orthogonal;

wherein the first end of the latch installation tool extends away from an intersection of the first and second axes along the first axis and the second end of the latch installation tool extends towards the intersection of the axes along the second axis, and wherein the central portion has first and second complimentary non right angle bends between the first and second ends.

12. The method of claim 5, wherein the latch installation tool is coupled to the second latch fitting by sliding in a direction parallel to a direction of movement of the drawer or cupboard door.

13. The method of claim 5, further comprising attaching a latching member to the first latch fitting, the latching member configured to releasably engage with the second latch fitting when the drawer or cupboard door is closed.

14. A childproof latch fitting system for a drawer or cupboard comprising:

a first latch fitting mountable to the drawer or a door of the cupboard;

a second latch fitting mountable to a carcase of the drawer or a wall of the cupboard; and a latch installation tool to spatially locate the first and second latch fittings at a pre-determined distance respectfully one from the other, wherein the latch installation tool includes first and second ends extending from a connecting portion, the first and second ends configured to releasably engage the first and second latch fittings after the second latch fitting is fixed in place to the carcase of the drawer or wall of the cupboard and prior to the first latch fitting being fixed to the cupboard door or drawer, such that the first latch fitting is supported at the predetermined distance from the second latch fitting by the latch installation tool;

wherein the first end of the latch installation tool is adapted to slidingly engage the first latch fitting along a first axis;

wherein the second end of the latch installation tool is adapted to slidingly engage the second latch fitting along a second axis, the first axis and second axis being orthogonal;

wherein the first end of the latch installation tool extends away from an intersection of the first and second axes along the first axis and the second end of the tool extends towards the intersection of the axes along the second axis; and whereby the second latch fitting can be mounted to the carcase of the drawer or wall of the cupboard and the second end of the latch installation tool can be releasably engaged therewith by sliding along a horizontal axis such that the first latch fitting can be releasably engaged with the first end of the latch installation tool by sliding along a vertical axis to thereby support and locate the first latch fitting along a vertical surface of the door of the cupboard or the drawer when in a closed position, and whereby opening of the door of the cupboard or the drawer is along a direction parallel to the horizontal axis such that the latch installation tool can be disengaged from the second latch fitting by movement of the door or the drawer.

15. A childproof latch fitting system according to claim 14, wherein at least one of the first latch fitting or second latch fitting includes a slot for receiving the first end or second end of the latch installation tool, respectively.

16. A childproof latch fitting system according to claim 14, further comprising a latching member adapted to be received by the first latch fitting.

17. A childproof latch fitting system according to claim 15, wherein the latching member further comprising a cantilever member with a holed section for receiving a hook of the second latch fitting.

* * * * *